(12) United States Patent
Chiu

(10) Patent No.: US 6,928,511 B2
(45) Date of Patent: Aug. 9, 2005

(54) METHOD AND SYSTEM FOR MANAGING VIRTUAL MEMORY

(75) Inventor: Yu-Ping Chiu, Taipei (TW)

(73) Assignee: High Tech Computer, Corp., Taoyuan (TW)

(*) Notice: Subject to any disclaimer, the term of this patent is extended or adjusted under 35 U.S.C. 154(b) by 322 days.

(21) Appl. No.: 10/379,444

(22) Filed: Mar. 3, 2003

(65) Prior Publication Data
US 2004/0177214 A1 Sep. 9, 2004

(51) Int. Cl.[7] .......................... G06F 12/00; G06F 12/06
(52) U.S. Cl. .................. 711/103; 711/100; 711/154; 711/200; 365/189.01; 365/189.05; 365/185.33; 365/230.03
(58) Field of Search ............... 365/185.33, 189.01, 365/189.05, 230.03; 711/100, 103, 154, 200

(56) References Cited

U.S. PATENT DOCUMENTS

| | | | | |
|---|---|---|---|---|
| 4,562,532 A | * | 12/1985 | Nishizawa et al. | 711/170 |
| 5,471,604 A | * | 11/1995 | Hasbun et al. | 711/4 |
| 5,530,673 A | * | 6/1996 | Tobita et al. | 365/185.09 |
| 5,905,993 A | * | 5/1999 | Shinohara | 711/103 |
| 6,230,233 B1 | * | 5/2001 | Lofgren et al. | 711/103 |
| 6,614,685 B2 | * | 9/2003 | Wong | 365/185.11 |
| 6,754,765 B1 | * | 6/2004 | Chang et al. | 711/103 |

* cited by examiner

Primary Examiner—Tuan V. Thai
(74) Attorney, Agent, or Firm—Ladas & Parry LLP

(57) ABSTRACT

A method and system of managing virtual memory for a flash-memory system. Logical blocks in a buffer are used to store data copied from a physical block in a flash-memory. An operating system searches data in the buffer first. If the data is in the buffer, it is accessed. If not, the operating system searches for the data in the flash memory, meanwhile writing a logical block having a dirty flag back to a logical block.

10 Claims, 4 Drawing Sheets

METHOD AND SYSTEM FOR MANAGING VIRTUAL MEMORY

BACKGROUND OF THE INVENTION

1. Field of the Invention

The present invention relates to a method and system for managing virtual memory, and particularly for flash memory.

2. Description of the Related Art

Non-volatile semiconductor memory, such as flash memory, is useful for relatively long-term storage in computer systems, more particularly, for pocket PC. Spare regions of flash memories have an advantage of storing various extensions of software, for example, CPQ OPTION JACKET, important documents or data, and others.

It is not easy to access flash memory. Flash memories, like a hard disk, are divided into pages and blocks. Rather than writing to just one word in a page, the entire page must be written to at the same time, and individual bytes cannot be written. The page must be cleared of any previous data before being written, clearing is accomplished by a flash erase cycle. An entire block pages is erased at once. For example, if a block has 16 pages, the entire block of 16 pages must be erased at once, while all 512 bytes on a page must also be written together.

To make flash memory easy for users to store code and data, there is a need for a virtual memory management system and method to realize a flash-file system.

SUMMARY OF THE INVENTION

It is therefore an object of the present invention to take advantage of spare regions in flash memory to implement a flash file system.

To achieve the above objects, the present invention discloses a method and system of managing virtual memory for a flash-memory system. Logical blocks in a buffer are used to store data copied from physical blocks in a flash-memory.

An input-output apparatus requests an operating system to access first data. The operating system searches data of logical blocks in the buffer. If the data address matches, the logical block storing the first data is in the buffer and is then accessed. If the data address does not match, the logical block storing the first data is not in the buffer and execution proceeds to search data of physical blocks in flash memory.

Before searching data of physical blocks, the operating system checks if a dirty flag of the logical block has been enabled. If so, the operating system writes the logical block back to the physical block in the flash memory. If not, a write-back process is saved when the operating system gets rid of the logical block in the buffer.

The operating system searches data of physical blocks in the flash memory. If the data address matches, the physical block storing the first data is in the flash memory and then copied to a logical block. If the data address does not match, the physical block storing the first data is not in the flash memory. Execution goes back to the start to access data.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE INVENTION

Figure 1:
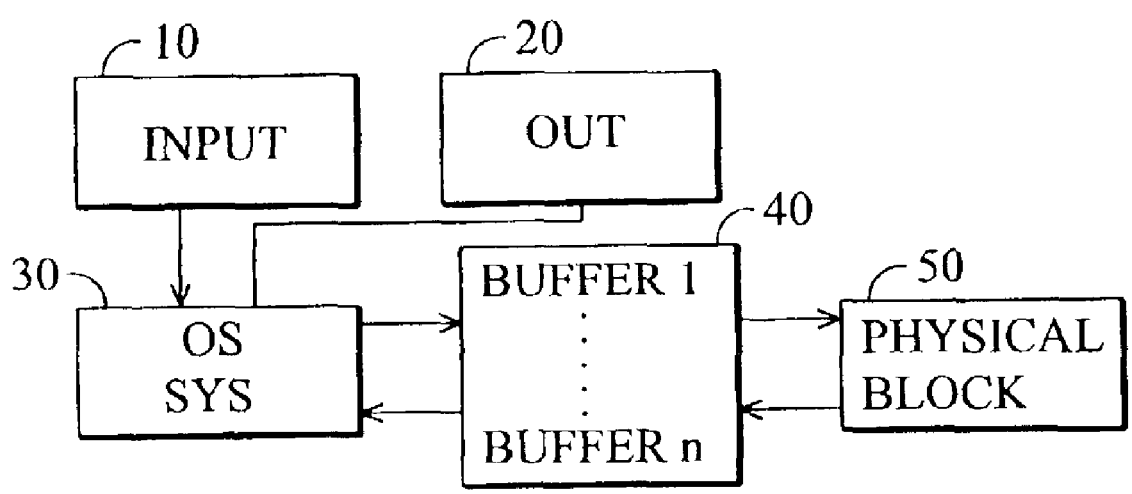
FIG. 1 is a block diagram of a system for managing virtual memory.

FIG. 1 is a block diagram of a system for managing virtual memory. The system includes an input device 10, an output device 20, an OS (operating system) file system 30, a buffer 40, and a flash memory 50.

Figure 2A:
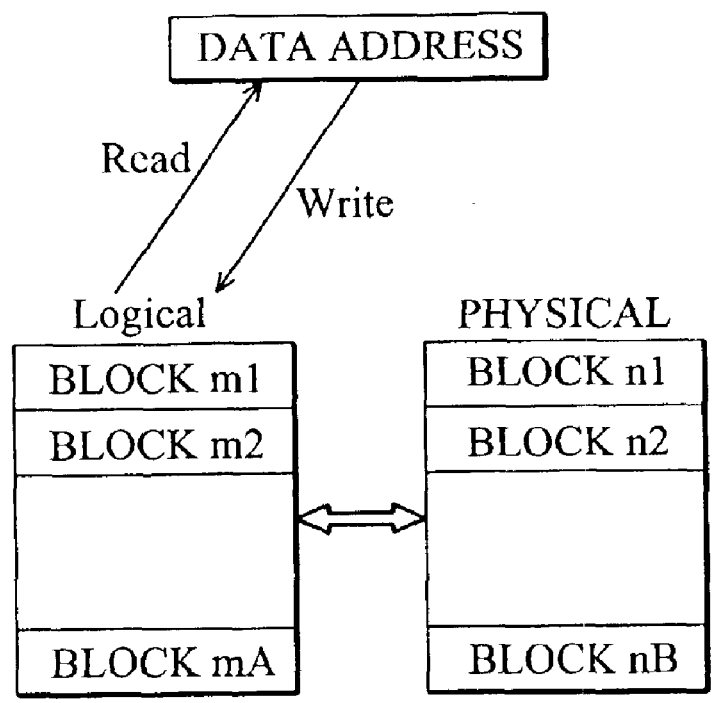
FIG. 2A shows virtual memory and flash memory.
Figure 2B:
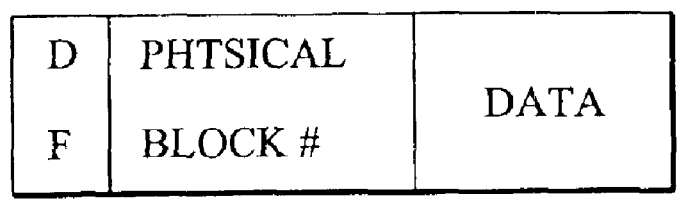
FIG. 2B shows contents of a logical block.

FIG. 2A shows virtual memory and flash memory. The buffer 40 includes logical blocks m1–mA. The flash memory includes physical block n1–nB. Logical blocks m1–ma and physical blocks n1–nB are all accessed by addresses. FIG. 2B shows contents of a logical block. A logical block includes data and address copied from a physical block and a dirty flag for indicating write-back. Logical blocks are updated according to a range in which their addresses are located.

The dirty flag tells the operating system 30 if the logical block has been modified. If it has been, then the logical block is discarded and must be written back to the flash memory 50. If it has not been, a write-back process is saved when the operating system 30 gets rid of the logical block in the buffer 40.

Figure 3:
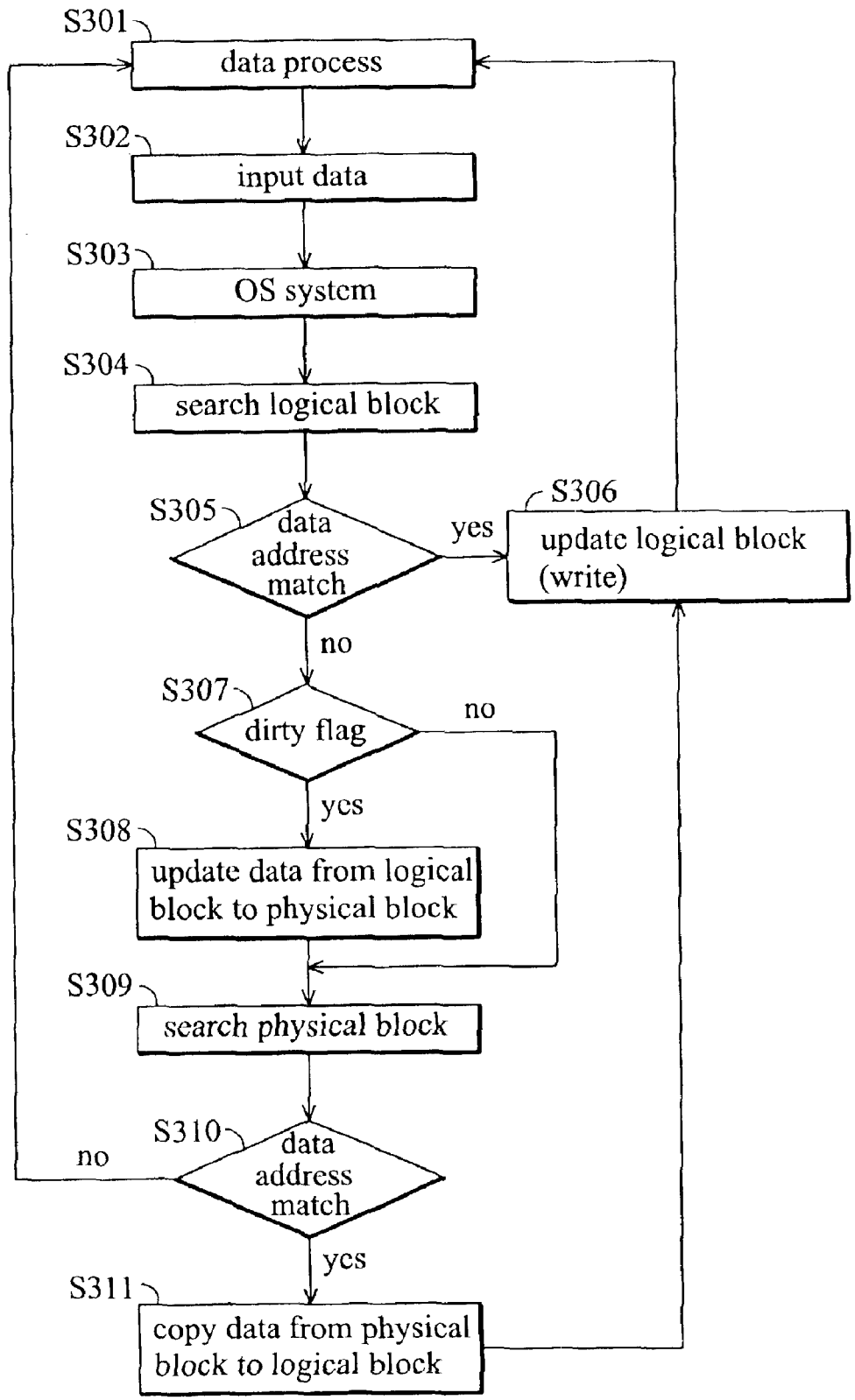
FIG. 3 is a flowchart for managing input data of the virtual memory.

FIG. 3 is a flowchart for managing input data of the virtual memory.

At step S301, input data process starts.

At step S302, data Dx1 is input from the input device 10.

At step S303, the input device 10 requests the operating system 30 to write the data Dx1.

At step S304, the operating system 30 searches data Dx1 in logical blocks in the buffer 40.

At step S305, if the data address matches that of data Dx1, a logical block mx1 storing the data Dx1 is in the buffer 40 and execution proceeds to step S306. If the data address does not match that of data Dx1, there is no logical block storing the data Dx1 in the buffer 40 and execution proceeds to step S307.

At step S306, the logical block mx1 storing the data Dx1 in the buffer 40 is updated. The dirty flag of the logical block mx1 is enabled.

At step S307, if there is a logical block mk1 in which the dirty flag is enabled, execution proceeds to step S308. If there is no logical block in which the dirty flag is disabled, execution proceeds to step S309.

At step S308, the data of the physical block nkl in the flash memory 50 is updated by the data of the logical block mk1, in which the dirty flag is enabled, in the buffer 40.

At step S309, the operating system 30 searches the physical block which stores the data Dx1 in the flash memory 50.

At step S310, if the data address matches, a physical block nx1 storing the data Dx1 is in the flash memory 50 and execution proceeds to step S311. If the data address does not match, there is no physical block storing the data Dx1 in the flash memory 50 and execution goes back to step S301.

At step S311, the operating system 30 copies the physical block nx1 in the flash memory 50 to a logical block mz1 in the buffer 40 and execution proceeds to step S306. The logical block mz1 is updated by the data Dx1.

Figure 4:
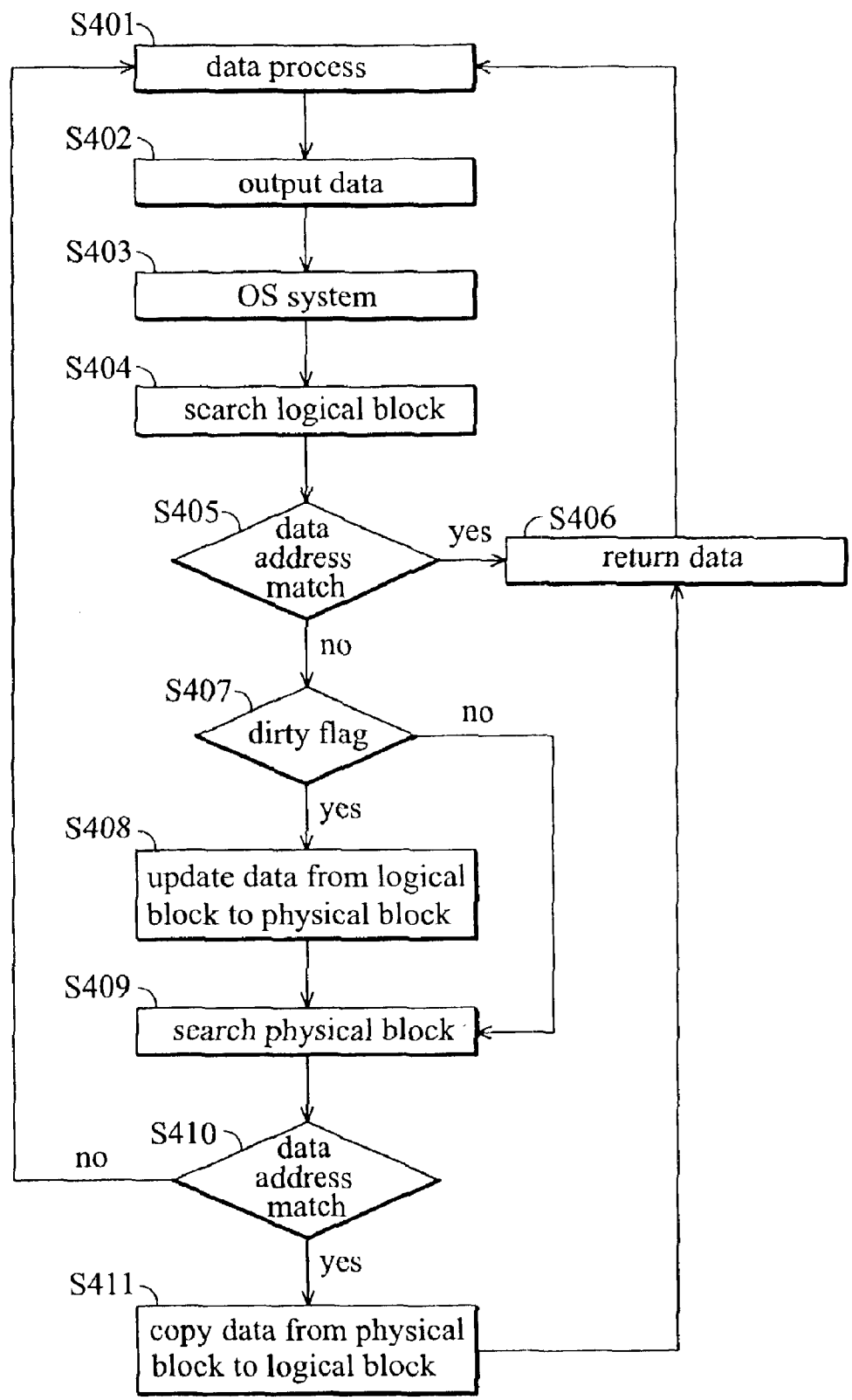
FIG. 4 is a flowchart for managing output data of the virtual memory.

FIG. 4 is a flowchart for managing output data of the virtual memory.

At step S401, the output data process starts.

At step S402, data Dx2 is required from the output device 20.

At step S403, the output device 20 requests the operating system 30 to return the data Dx2.

At step S404, the operating system 30 searches data Dx2 in the logical blocks in the buffer 40.

At step S405, if the data address matches that of data Dx2, a logical block mx2 storing the data Dx2 is in the buffer 40 and execution proceeds to step S406. If the data address does not match that of data Dx2, there is no logical block storing the data Dx2 in the buffer 40 and execution proceeds to step S407.

At step S406, the data Dx2 stored in the logical block mx2 in the buffer 40 is returned.

At step S407, if there is a logical block mk2 in which the dirty flag is enabled, execution proceeds to step S408. If there is no logical block in which the dirty flag is disabled, execution proceeds to step S409.

At step S408, the data of the physical block nk2 in the flash memory 50 is updated by the data of the logical block mk2, in which the dirty flag is enabled, in the buffer 40.

At step S409, the operating system 30 searches the physical block which stores the data Dx2 in the flash memory 50.

At step S410, if the data address matches, a physical block nx2 storing the data Dx2 is in the flash memory 50 and execution proceeds to step S411. If the data address does not match, there is no physical block storing the data Dx2 in the flash memory 50 and execution goes back to step S401.

At step S411, the operating system 30 copies the physical block nx2 in the flash memory 50 to a logical block mz2 in the buffer 40 and execution proceeds to step S406. The logical block mz2 is updated by the data Dx2.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method of managing virtual memory for a flash-memory system comprising:
   accessing of first data by an input-output apparatus;
   determination of whether there is a first logical block in a buffer storing the first data by an operating system;
   accessing the first logical block if the first logical block storing the first data is in the buffer;
   determining whether there is a second logical block having a dirty flag enabled if the first logical block storing the first data is not in the buffer;
   updating second data of the second logical block to a second physical block in the flash-memory;
   determining whether there is a first physical block storing the first data in the flash-memory; and
   copying the first data stored in the first physical block to a third logical block if the first physical block is storing the first data in the flash-memory.

2. The method as claimed in claim 1, wherein:
the step of accessing first data by an input-output apparatus is writing the first data.

3. The method as claimed in claim 2, wherein:
the step of accessing the first logical block if the first logical block storing the first data is in the buffer is writing the first data to the first logical block.

4. The method as claimed in claim 1, wherein:
the step of accessing first data by an input-output apparatus is reading the first data.

5. The method as claimed in claim 4, wherein:
the step of accessing the first logical block if the first logical block storing the first data is in the buffer is reading the first logical block.

6. A system of managing virtual memory comprising:
   an input-output apparatus for accessing first data;
   a buffer having plural logical blocks for storing data copied from plural physical blocks;
   a flash-memory having the plural physical block for storing the data; and
   an operating system for managing accessing data between the flash-memory, the buffer, and the input-output apparatus;
   wherein the operating system accesses a first logical block if the first logical block storing the first data is in the buffer, determines whether there is a second logical block having a dirty flag enabled if the first logical block storing the first data is not in the buffer, updates second data of the second logical block to a second physical block in the flash-memory, determines whether there is a first physical block storing the first data in the flash-memory, copies the first data stored in the first physical block to a third logical block if there is the first physical block storing the first data in the flash-memory, and updates the third logical block.

7. The system as claimed in claim 6, wherein:
the operating system accessing first data by an input-output apparatus is writing the first data.

8. The system as claimed in claim 7, wherein:
the operating system accessing the first logical block if the first logical block storing the first data is in the buffer is writing the first logical block.

9. The system as claimed in claim 6, wherein:
the operating system accessing first data by an input-output apparatus is reading the first data.

10. The system as claimed in claim 9, wherein:
the operating system accessing the logical block if the first logical block storing the first data is in the buffer is reading the logical block.

* * * * *